United States Patent [19]

Wirtz et al.

[11] 4,094,210
[45] June 13, 1978

[54] KNOB FOR SEAT-ANGLE ADJUSTER OF MOTOR-VEHICLE SEAT

[75] Inventors: Egon Wirtz, Remscheid-Lennep; Klaus Berghaus, Wuppertal, both of Germany

[73] Assignee: Keiper KG, Remscheid-Hasten, Germany

[21] Appl. No.: 702,857

[22] Filed: Jul. 6, 1976

Related U.S. Application Data

[62] Division of Ser. No. 544,780, Jan. 28, 1975, Pat. No. 3,976,327, and Ser. No. 572,300, Mar. 28, 1975, Pat. No. 3,966,253.

[30] Foreign Application Priority Data

Jul. 4, 1975 Germany .................. 7521224[U]

[51] Int. Cl.² .................. G05G 1/10; B60N 1/02
[52] U.S. Cl. .................. 74/553; 16/121; 292/347; 296/65 R
[58] Field of Search .................. 74/553, 558 S, 528; 16/121, DIG. 30; 296/65 R, 65 A; 116/133, 142 R, 59; 292/347, 348, DIG. 30; 403/359, 361; 285/DIG. 22

[56] References Cited

U.S. PATENT DOCUMENTS

| | | | |
|---|---|---|---|
| 1,721,065 | 7/1929 | Bodmer | 16/121 X |
| 2,610,877 | 9/1952 | Weaver | 292/347 X |
| 2,826,934 | 3/1958 | Jakeway | 74/553 |
| 2,982,335 | 5/1961 | Garvey | 296/65 R X |
| 2,998,733 | 9/1961 | Thompson | 74/553 |
| 3,410,247 | 11/1968 | Dronberger | 74/553 X |
| 4,000,539 | 1/1977 | Neyer | 74/553 X |

FOREIGN PATENT DOCUMENTS

| | | | |
|---|---|---|---|
| 1,516,995 | 3/1968 | France | 16/121 |
| 1,472,374 | 12/1968 | Germany | 74/553 |
| 371,397 | 5/1939 | Italy | 74/553 |
| 260,102 | 10/1926 | United Kingdom | 292/347 |

Primary Examiner—Samuel Scott
Assistant Examiner—Don E. Ferrell
Attorney, Agent, or Firm—Michael J. Striker

[57] ABSTRACT

A knob is used on an adjustment member rotatable about an axis and having a periphery formed with a plurality of radially outwardly open recesses. This member may be the adjustment member of a motor-vehicle seat-angle adjuster. The knob comprises an annular collar closely surrounding the periphery of the adjustment member, a plurality of entrainment formations projecting inwardly from the collar into every other recess, and a plurality of hooks each engaging axially through the remaining recesses with the member. The hooks and the formations together transmit angular force between the member and the knob which is made of synthetic-resin material as one integral piece.

8 Claims, 6 Drawing Figures

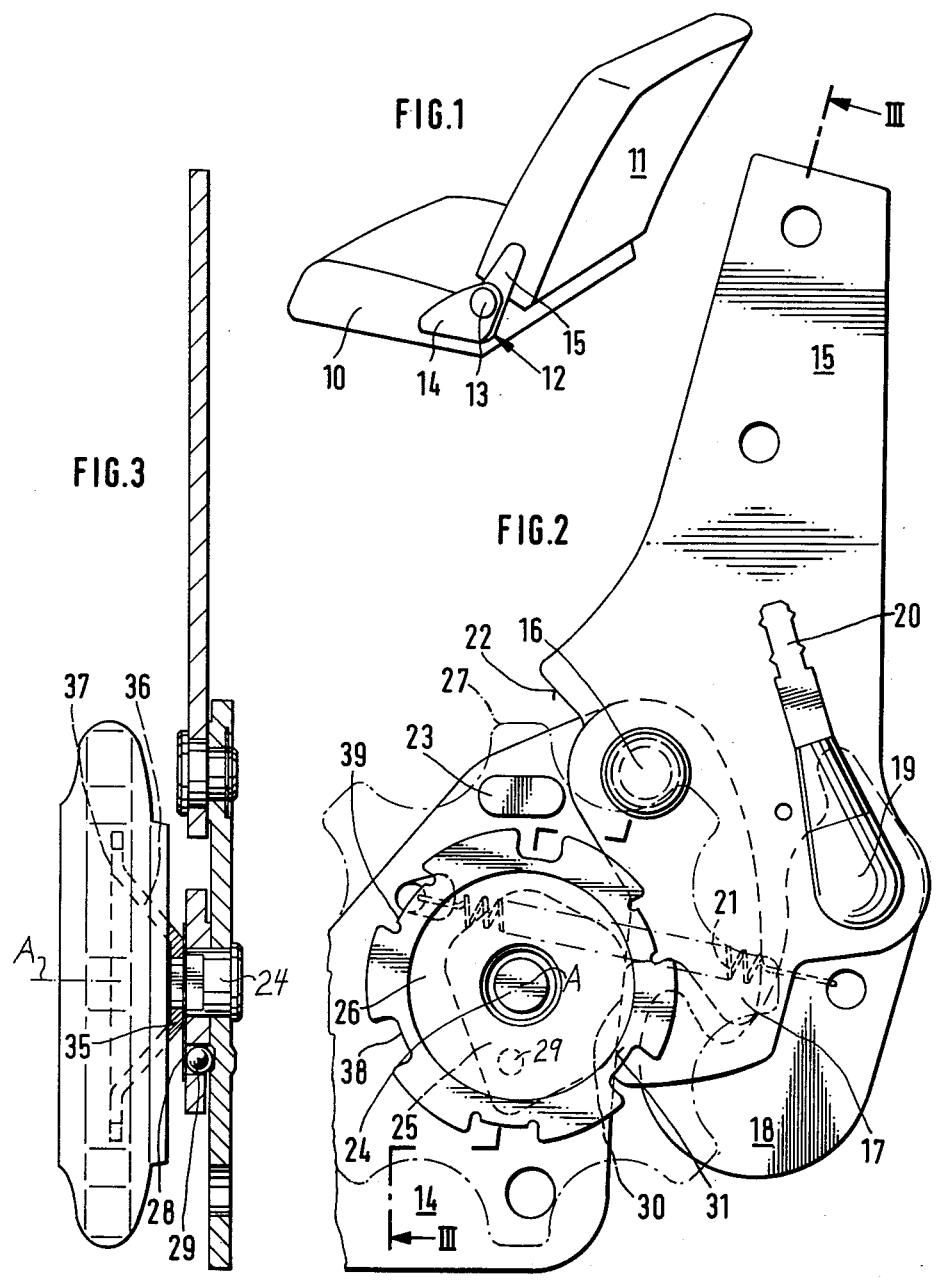

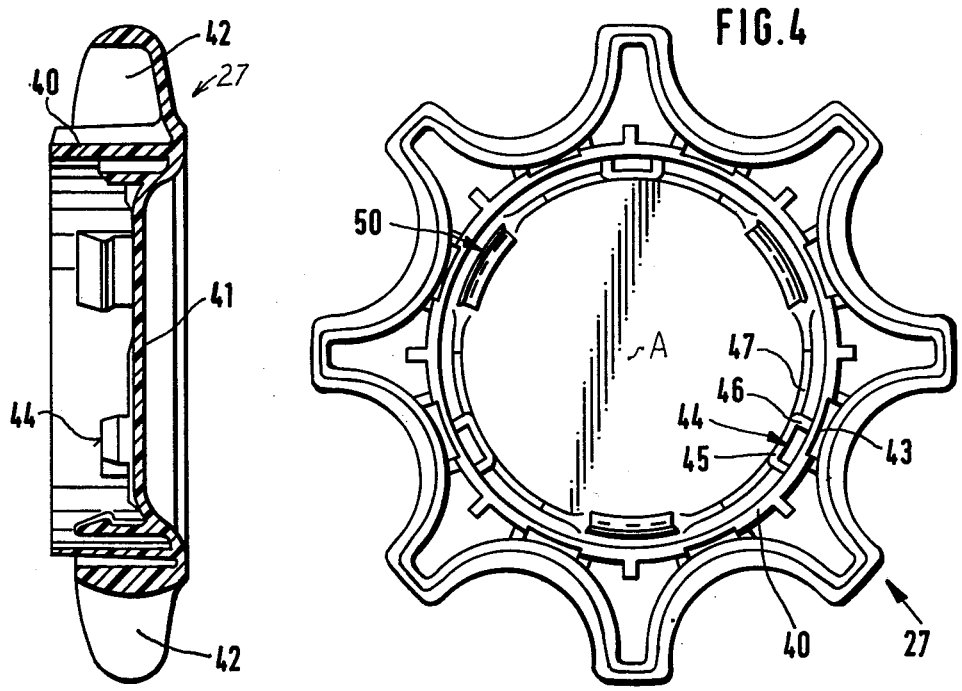
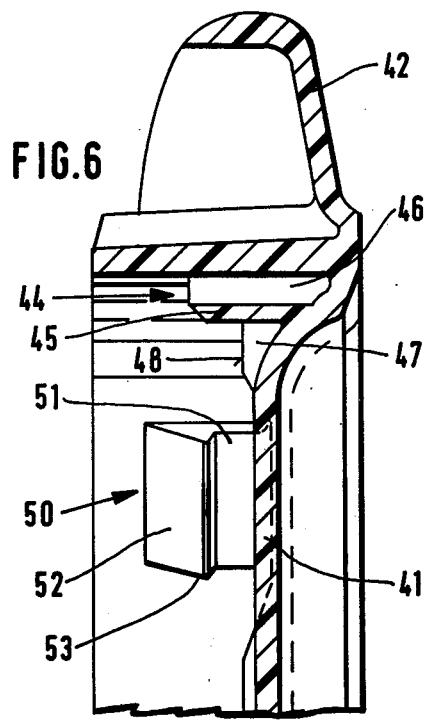

KNOB FOR SEAT-ANGLE ADJUSTER OF MOTOR-VEHICLE SEAT

This application is a division of Ser. No. 544,780, filed Jan. 28, 1975 and now U.S. Pat. No. 3,976,327, and of Ser. No. 572,300, filed Mar. 28, 1975, and now U.S. Pat. No. 3,966,253.

BACKGROUND OF THE INVENTION

The present invention relates to an adjustment device. More particularly this invention concerns a knob usable on a device for adjusting the position of a motor-vehicle seat.

It is known to provide a vehicle seat with an adjustment mechanism such as described in the commonly assigned and copending patent application Ser. No. 544,780, now U.S. Pat. No. 3,976,327 and 572,300, now U.S. Pat. No. 3,966,253, filed Jan. 28, 1975, and Mar. 28, 1975, respectively. Such devices normally are operated by a knob provided at the hinge between the back part and the seat part of the motor-vehicle seat. This knob can either be rotated to loosen a setting arrangement that allows the back to be displaced and then tightened again in another position, or it allows the rotation of a cam having surfaces that establish different rest positions for the back part of the seat.

The knob that operates this adjustment device is normally of relatively large diameter and made of synthetic-resin material. Its principal functions are to cover and protect the mechanism of the adjustment device and to provide the user with a good grip on the adjustment member of this device.

Such a knob is frequently formed as a synthetic-resin ring which is fitted around the metal adjustment member and is then clamped in place by a disc or the like that is screwed to the face of the adjustment member. Such a structure has the disadvantage of relatively high fabrication costs due to the two-part construction that must in addition be held in place by supplemental screws. Furthermore such arrangements occasionally break, as they are unable to transmit sufficient torque between the synthetic-resin knob part and the metal adjustment member. Also it is noted that the particular position of such a knob, at the lower part of the back of the front seat exposes it to occasionally considerable physical stressing, particularly when people climbing into or out of the back seat of a two-door vehicle step on or kick this knob.

A prior-art knob can be seen in German Pat. No. 1,755,310.

SUMMARY OF THE INVENTION

It is therefore an object of the present invention to provide an improved adjustment arrangement.

Another object of this invention is the provision of a motor-vehicle seat adjustment device having an improved knob.

A further object of this invention is to provide a knob which can transmit relatively high angular forces, which is inexpensive to make, and which can withstand considerable physical shocks.

These objects are attained according to the present invention by providing in combination with an adjustment device having an adjustment member rotatable about an axis and having a periphery formed with a plurality of radially outwardly open recesses, a knob having an annular collar closely surrounding the periphery, a plurality of entrainment formations projecting inwardly from the collar into respective recesses on the periphery, and a plurality of hooks each engaging axially through a respective recess with the member. These hooks alternate with the formations around the periphery so that the hooks and the formations can transmit force angularly between the member and the knob.

In accordance with another feature of this invention the knob is integrally made of resilient synthetic-resin material. The adjustment device in question is a motor-vehicle seat-angle adjuster including a pair of hinge parts and means connected to the member for varying the relative position of these hinge parts.

According to another feature of this invention each of the hooks has a stem engaging through the respective recess and angularly engageable with the sides thereof, and a hook head engaging behind the member. Each of these hook heads is formed with a camming surface that is inclined to the axis so that the knob can simply be snapped over the adjustment member.

According to a further feature of the present invention each of the entrainment formations is generally U-shaped and has a bight portion and a pair of shanks extending radially between this bight portion and the collar. Thus this collar, which along with the periphery is of circular shape, can transmit considerable angular forces to the adjustment member.

According to yet another feature of the present invention the knob is formed with bearing ribs which extend generally from the bight portions and lie against the member. These bearing ribs extend angularly from the bight portions and define a plane perpendicular to the axis. The knob rests at this plane against the planar face of the adjustment member. In addition the knob is formed with a series of peripheral bumps or bosses which facilitate gripping of the knob, and is formed with a face plate or disc which closes off the knob so that a truly one-piece structure is obtained.

With the knob according to the present invention it is therefore possible to transmit relatively great angular forces or torques to the adjustment member by means of the knob. At the same time the knob presents an attractive appearance and is so strong that it can withstand virtually any of the punishment such as an adjustment knob is subjected to in a motor-vehicle seat-angle adjuster. Furthermore the one-piece synthetic-resin structure of this knob makes it a very inexpensive item to produce so that the overall cost of the adjustment mechanism can be held down.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings.

BRIEF DESCRIPTION OF THE DRAWINGS:

FIG. 1 is a perspective view of a motor-vehicle seat in accordance with this invention;

FIG. 2 is a side view of the seat-angle adjuster in accordance with this invention, the knob according to this invention being removed for clarity of view;

FIG. 3 is a section taken along line III—III of FIG. 2, with the adjustment knob shown in place;

FIG. 4 is a back view of the adjustment knob in accordance with this invention;

FIG. 5 is a diametral section through the knob of FIG. 4; and

FIG. 6 is a large-scale view of a detail of FIG. 5.

DESCRIPTION OF THE PREFERRED EMBODIMENT

As shown in FIG. 1 a motor-vehicle seat has a back part 11 and a seat part 10 interconnected at a hinge 12 having a hinge part 14 secured to the seat part 10 and a hinge part 15 secured to the back part 11. An adjustment mechanism 13 is provided between these parts 14 and 15 and is connected by a not-illustrated rod to a similar such hinge 12 on the other side of the seat. The hinge part 15 connected to the seat back 11 is formed at its lower end with a tip 17 engageable in a hook 18 pivoted at 19 on this back part 15. A release lever 20 can pivot the hook 18 against the force of a spring 21 so as to allow the hinge part 15 and the back 11 to pivot forwardly into a position defined by a surface 22 on the back part 15 and an abutment 23 on the front part 14. Such pivoting is necessary in order to allow a rider to climb past the front seat and into the back seat of a two-door vehicle.

The adjustment mechanism 13 according to this invention comprises an axis-defining pin 24 which may pass all the way through the seat to the opposite hinge 12, and on which is mounted a multifaced cam 25. On the outside of this shaft 24 there is provided a metal adjustment member or disc 26 on which is mounted a synthetic-resin adjustment knob 27 as will be described below. The cam 25 is formed with a throughgoing hole in which is provided a ball 29 pressed against the plate 24 by a leaf spring 28 so that free rotation of the cam 25, shaft 24 and adjustment member 26 is prevented. The rear seat part 15 has a surface 30 that can press radially against any of the facets 31 of the cam 25. These facets 31 are all spaced differently from the axis defined by the shaft 24 so that the angular position of the cam 25 determines the relative angles at which the elements 14 and 15 lie with respect to one another.

The adjustment member 26 is formed of a frustoconical central portion 36 centered on the axis defined by the shaft 24 and an outer flange portion 37 formed with three relatively deep but angularly short recesses 38 and alternating with these recesses 38 three relatively shallow but wide recesses 39.

As better shown in FIGS. 4 and 5 the knob 27 is entirely made of synthetic-resin material in one piece, here a polyamide such as Nylon 6 being used. The knob 27 is formed basically of a central cylindrical collar 40 which is closed by an end plate or disc 41 and is formed around its periphery with eight bosses or bumps 42. Between these bosses 42 the outer periphery of the knob 27 is connected rigidly at 43 to the collar 40 so as to make a very rigid assembly. The inner diameter of the circular collar 40 is slightly greater than the outer diameter of the adjustment plate 26.

Three angularly equi-spaced entrainment formations 44 are provided projecting inwardly from the collar 40. Each of these entrainment portions is of generally U-section and has a bight portion 45 lying on an imaginary cylinder centered on the axis A on which the collar 40 is also centered and a pair of shanks 46 extending radially between the bight portion 45 and the collar 44. Thus each of these entrainment formations is also rigidly secured to the collar 40. In addition the knob 27 is formed adjacent each of the entrainment formations 44 with a pair of angularly extending reinforcement ribs 47 having inner surfaces 48 that define a plane adapted to lie against the planar face of the member 26. These ribs 47 lie on the same imaginary cylinder on which the bight portion 45 lies and extend angularly outwardly from each of the formations 44 at the junction between the bight portion 45 and shanks 46 thereof.

In addition alternating between the formations 44 are three angularly equi-spaced hooks 50 lying on the same imaginary cylinder described above and each having a stem 51 on which is formed a hook head 53 having a camming surface 52 inclined at an angle of between 20° and 40°, here 30°, to the axis A.

When the seat adjuster 13 is assembled the knob 27 can simply be snapped over the plate 26. To do this the hooks 50 are aligned with the recesses 39 and the formations 44 with the recesses 38, these various parts conforming closely in shape. Then the knob 27 is simply pressed against the plate 26 so as to deflect the heads 53 radially outwardly until the inner edges of the surfaces 52 snap around in back of the plate 26 at the recesses 39. The knob 27 is then securely and rigidly mounted on the plate 26. It is nonetheless removable by deflection of at least one of the heads 53 backwardly while pulling on the knob 27. It is noted that angular force is transmitted between the knob 27 and the plate 26 by the hooks 50 as well as by the formations 44 so that an extremely good torque transmission is possible between these two parts.

While the invention has been illustrated and described as embodied in a knob for a seat-angle adjuster for a motor-vehicle seat, it is not intended to be limited to the details shown, since various modifications and structural changes may be made without departing in any way from the spirit of the invention. In particular the knob can readily be used on various other types of adjustment mechanisms, such as the head-restraint adjuster or the seat height or position adjuster in a motor vehicle.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In combination with an automotive-vehicle seatangle adjustment device having a pair of hinge parts and means including an adjustment member rotatable about an axis and having a periphery formed with a plurality of radially outwardly open recesses for varying the relative position of said hinge parts, a knob having
   an annular collar closely surrounding said periphery,
   a plurality of entrainment formations projecting radially inwardly from said collar into respective recesses, and
   a plurality of radially outwardly deflectable hooks each engaging axially through a respective recess with said member, said hooks alternating with said formations around said periphery and each having a stem engaging through the respective recess and a hook head engaging behind said member, whereby said hooks and said formations can transmit force angularly between said member and said knob.

2. The combination defined in claim 1, wherein each of said formations is generally U-shaped and has a bight portion and a pair of shanks extending radially between said bight portion and said collar.

3. The combination defined in claim 2, wherein said collar and said periphery are circular.

4. The combination defined in claim 3, wherein said knob is formed with bearing ribs extending generally from said bight portions and lying against said member.

5. The combination defined in claim 4, wherein said ribs extend angularly from said portions.

6. The combination defined in claim 2, wherein said heads have camming surfaces inclined to said axis, whereby said hook heads can be snapped over said periphery at the respective recesses.

7. The combination defined in claim 6, wherein said knob is unitarily made of resilient synthetic-resin material.

8. The combination defined in claim 7, wherein said knob has an end wall lying generally perpendicular to said axis and entirely covering said collar and an outer edge formed with a plurality of angularly equi-spaced radially extending bosses.

* * * * *